Oct. 3, 1961 H. D. CRANE 3,003,140

MAGNETIC CORE NEGATION CIRCUIT

Filed Dec. 16, 1957 2 Sheets-Sheet 1

INVENTOR.
HEWITT D. CRANE

BY Christie, Parker & Hale
ATTORNEYS

INVENTOR.
HEWITT D. CRANE

BY

Christie, Parker & Hale
ATTORNEYS

United States Patent Office 3,003,140

Patented Oct. 3, 1961

3,003,140

MAGNETIC CORE NEGATION CIRCUIT

Hewitt D. Crane, Palo Alto, Calif., assignor to Burroughs Corporation, Detroit, Mich., a corporation of Michigan Filed Dec. 16, 1957, Ser. No. 703,003
9 Claims. (Cl. 340—174)

This invention relates to binary information storage and transfer apparatus, and more particularly, is concerned with a magnetic core circuit by means of which a binary digit transferred into the device is transferred out as the opposite binary digit, i.e., a device for performing a negating function.

In copending application Serial No. 698,633, filed November 25, 1957, in the name of Hewitt D. Crane, there is described a core register having a novel transfer circuit requiring no diodes or other impedance elements in the transfer loops. The basic binary storage element was an annular core having an input and an output aperture in the core. The binary digits zero were stored in the form of flux oriented in the same direction in the core element on either side of the respective apertures, while the binary digits one were stored in the form of flux extending in opposite directions on either side of the respective apertures.

It is frequently desirable in the design of logic circuits to convert a binary one into a binary zero, or vice versa. Circuits for doing this are generally called converter or negation circuits. Various electronic circuits have heretofore been proposed which perform the function of negation.

The present invention is directed to a core device for performing the negating function. It utilizes the principles set forth in the above-mentioned copending application in which binary digits are stored as particular flux patterns around the input and output apertures and binary information can be transferred between cores unidirectionally without the use of diodes or other nonlinear impedance devices in the transfer circuit. Functionally it differs only from the core circuit above described in that it performs the negating function of transmitting a binary one after receiving a binary zero, and vice versa, transmitting a binary zero when it has received a binary one. In other words flux patterns around the input aperture and the output aperture always represent different binary digits and not the same binary digits as in the core element of the above-mentioned copending application.

In brief, the invention provides in its basic form, a magnetic core element of material having a high flux retentivity, the core having a substantially annular portion with a magnetic shunting portion extending between opposite regions of the annular portion. The core is provided with at least one input aperture and one output aperture extending through the annular portion of the core and located respectively on opposite sides of the shunting portion. A holding winding is wound on the shunting portion and a unidirectional current passed therethrough for maintaining the shunting portion in a substantially saturated condition. Means for initially putting the core in the cleared state is provided, which may be a clearing winding wound on the annular portion of the core adjacent the input aperture and including turns linking the core through the output aperture. Pulsing of the clearing winding with a unidirectional current pulse establishes a settable condition at the input aperture and an unblocked flux condition at the output aperture. A transfer loop links the core through the input aperture and another transfer loop links the core through the output aperture. A transfer pulse of sufficient magnitude applied to the input transfer circuit changes the flux orientation around the input aperture to a binary one condition and the flux orientation around the output aperture to a binary zero condition, thereby effecting the negation function.

For a more complete understanding of the construction and operation of the invention, reference should be had to the accompanying drawings, wherein.

Figure 1:
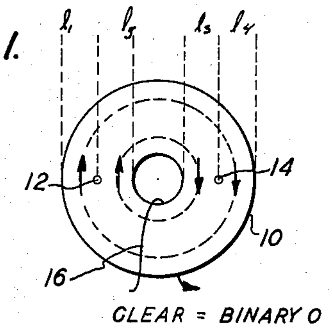
FIGS. 1 and 2 show a ferrite magnetic core element of known configuration in two conditions of flux orientation.

Consider an annular core, such as indicated at 10 in FIG. 1, made of a magnetic material, such as ferrite, having a "square" hysteresis loop, i.e., a material having a high flux retentivity or remanence. The annular core is provided with two apertures 12 and 14. Each of the apertures in effect divides the core into legs or parallel flux paths, the aperture 12 forming two legs $l_1$ and $l_2$, and the aperture 14 forming two legs $l_3$ and $l_4$. If a large current is passed through the central opening of the core 10, as by a clearing winding 16, the flux in the core may be saturated in a clockwise direction, as indicated by the arrows, and the core is said to be in the cleared or binary zero state. If a current is passed through one of the apertures 12 or 14, as by passing a current through a winding 18 passing through the aperture 12, in the manner described in detail in the above-mentioned copending application, the flux in the legs $l_1$ and $l_3$ is reversed, as indicated by the arrows in FIG. 2. The resulting flux pattern in the core is shown by the dotted lines, and the core is said to be in the set or binary one state.

Figure 2:
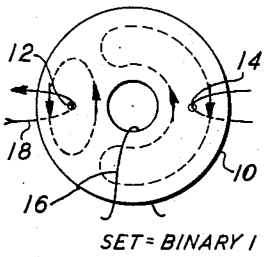
Figure 3:
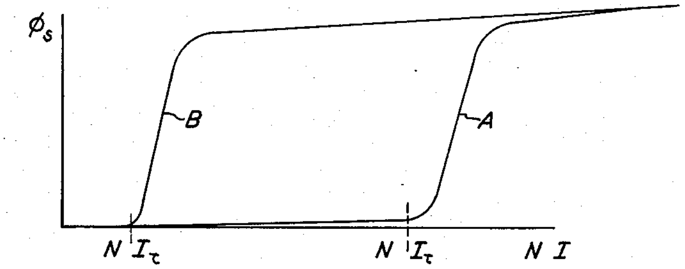
FIG. 3 is a set of curves illustrating the magnetizing properties of the core element shown in FIGS. 1 and 2.

If the core 10 is initially in its cleared condition, applying a current through the winding 18 having N turns linking the aperture 12 of the core 10 switches flux according to the relation set forth by curve A in FIG. 3. Thus as the current is increased up to a threshold level where $NI=NI_T$, substantially no flux is switched in the core. When the current exceeds the threshold level, the flux rapidly begins to switch with further increase of current until a saturation level is reached in which all of the flux is switched in the opposite direction. As mentioned above, this results in the flux pattern of FIG. 2 in which the core is in its set or binary one condition.

If a current is now passed through the winding 18 in the opposite direction, the resulting flux change as a function of current is represented by curve B of FIG. 3. In this case the current may increase to a threshold level where $NI=NI_t$ without appreciable switching of flux. With further increase in current, the flux begins to switch until a saturation level is reached in which all of the flux is switched that can be switched. What is happening in the latter case is that current passing through the winding 18 switches flux locally around the aperture 12 but does not switch any flux around the aperture 14.

Figure 4:
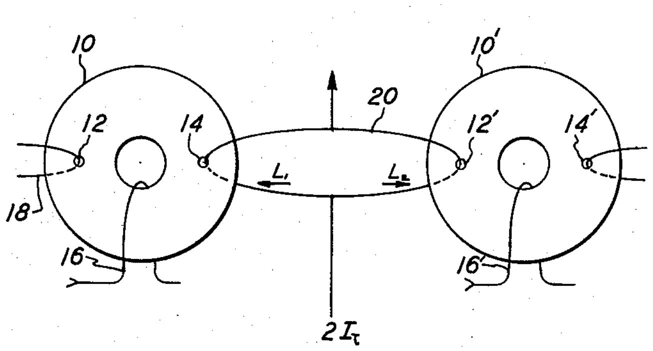
FIG. 4 is a schematic showing of a transfer circuit including two core elements of the type shown in FIGS. 1 and 2.

As further described in the above-identified copending application, the flux state of one core can be transferred to another core in the following manner. Consider the circuit of FIG. 4 including a transmitting core 10 and a receiving core 10′. A coupling loop 20 links the core 10 through the aperture 14 to the core 10′ through the aperture 12′. Assume a current applied across the transfer loop 20 sufficient to bring both cores to their thresholds $NI_T$. It will be seen that the current splits between the winding linking the aperture 14 of the transmitting core and the aperture 12′ of the receiving core. If both cores are in their cleared condition and the resistances are arranged so that the ampere turns linking the two cores are substantially equal, no flux will be switched in either the transmitting or the receiving core. However, if the transmitting core 10 has been previously set with its flux in the binary one condition, a current passing through the aperture 14 can switch flux locally in the core 10, since the threshold level for switching flux locally about an aperture when the core is in the set condition is much lower, as shown by curve B in FIG. 3. The switching of flux about the aperture 14 in the transmitting core 10 induces a voltage in the coupling loop which, by Lenz's law, opposes the flow of current in the branch of the coupling loop linking the aperture 14 of the transmitting core. As a result the current passing through the branch of the transfer loop 20 which links the aperture 12′ of the receiving core 10′ increases. The increased current is sufficient to switch flux in the receiving core 10′, thereby setting the receiver to the binary one condition. Thus it will be seen that the application of a transfer pulse of predetermined magnitude across the transfer loop 20 leaves the receiving core 10′ in the binary zero state or changes it to the binary one state, depending upon the existing condition of the transmitting core 10.

With this brief review of the operation of the core circuit for accomplishing straight transfer, consider the requirements of the core device to provide a negating type of transfer. When the input aperture 12 is in its cleared condition, as shown in FIG. 1, the output aperture 14 should be in its set condition, as shown in FIG. 2, if it is to operate as a negating device. A transfer of a zero to the core should not change this condition, but a transfer via the transfer winding 18 of a binary one should leave the core negating device with the flux condition of the input aperture being in the set condition as shown in FIG. 2, and the output aperture 14 being in the blocked (binary zero) condition as shown in FIG. 1.

Figure 5:
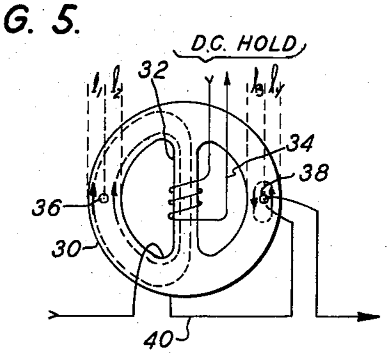
FIGS. 5 and 6 show a negating ferrite magnetic core element configuration according to the teaching of the present invention and illustrating two conditions of flux orientation.
Figure 6:
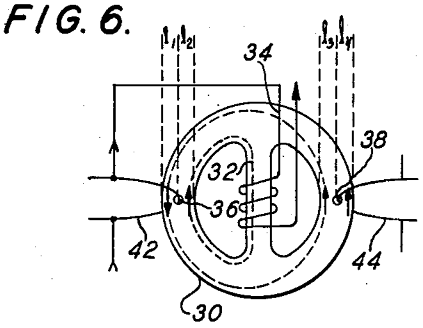

This is accomplished by the present invention by providing a core element as shown in FIGS. 5 and 6. Here the core element 30 is provided with a central shunting portion 32 on which is wound a hold winding 34. Input and output apertures 36 and 38 are provided in the core on either side of the shunt 32. A clearing winding 40 is preferably provided which is wound on the core 30 adjacent the input aperture 36 and links the core through the output aperture 38. Thus when a current pulse is sent through the clearing winding 40 in the direction indicated by the arrow, it satures the flux in the legs $l_1$ and $l_2$ on either side of the input aperture 36 in the same direction. A closed flux path extends through the shunting portion 32 for the flux in the legs $l_1$ and $l_2$. At the same time the ampere-turns linking the output aperture 38 set the flux locally in a closed path around the aperture 38 so that the flux extends in opposite directions in the legs $l_3$ and $l_4$. The initial condition described above for a negating device is now provided, namely, the portion of the core around the input aperture 36 is in the settable condition while the output aperture 38 is in the unblocked (binary one) condition.

Assume that a large current pulse is now passed through the input aperture 36, as by means of an input winding 42 linking the leg $l_1$ of the core 30 through the input aperture 36. The direction of current is such as to reverse the direction of flux in the leg $l_1$. The closed path of the reversed flux cannot extend through the leg $l_2$, since that leg is already saturated and can accept no additional flux in the same direction. By applying a D.C. holding current through the winding 34 on the shunting portion 32, flux is prevented from reversing in the shunting portion 32. Consequently, the only place where the flux can reverse in response to the current pulse on the input winding 42 is in the leg $l_3$. Thus as a result of the pulse on the input winding the second condition of the negating device as described above is now provided, namely, the core in the region of the input aperture 36 has the flux in the set or binary one condition while the core in the region of the output aperture 38 has flux in the blocked (binary zero) condition. While the direction of the arrows representing the flux about the output aperture 38 in FIGS. 5 and 6 is reversed from the direction of the arrows representing the flux about the output aperture 14 in FIGS. 1 and 2, this is of no consequence as to the overall operation and may be compensated for by reversing the direction in which current is passed through the output winding linking the output aperture 38 during transmission.

The holding winding has been described as having D.C. applied thereto in a direction to oppose reversal of flux in the shunt portion of the core when the input winding is pulsed. Alternately the holding winding may be energized only during the transfer operation, and so may be arranged to be pulsed by the advance current pulses. Further, the holding winding may be avoided altogether by embedding a permanent magnet in the shunt portion of the core.

Figure 7:
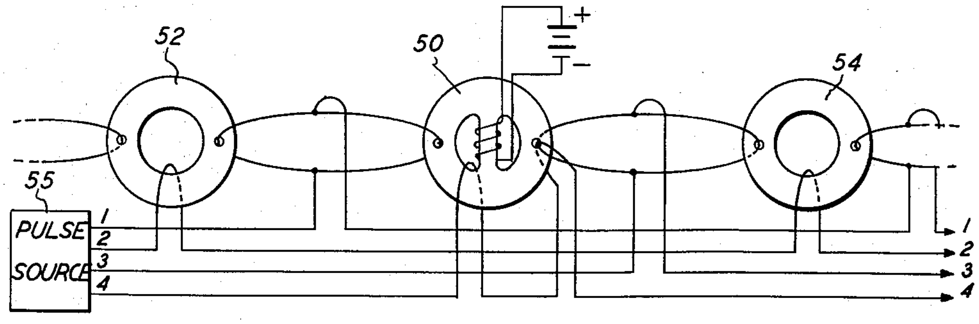
FIG. 7 is a schematic showing of a transfer circuit including one negating core element of the type shown in FIGS. 5 and 6.

The core circuit of FIGS. 5 and 6 can be used in a chain as a shifting register, either with other similar negating core devices, or with straight core devices as described in connection with FIGS. 1 and 2. Shifting is effected exactly as explained in connection with FIG. 4. An example of such a circuit is shown in FIG. 7. This circuit shows by way of example a negating core element 50 linked within two straight core elements 52 and 54 by suitable transfer loops between the apertures. A first transfer pulse is applied to the lead 1 from a suitable pulse source 55. The flux condition of the straight cores 52 and 54 are thereby transferred to the right, the flux condition at the output aperture of the core 52 being established at the input aperture of the negating core device 50. This results in the opposite flux condition, as explained above in connection with FIGS. 5 and 6, to appear at the output aperture of the negating core element 50. After the straight core elements 52 and 54 are cleared by means of a clearing pulse applied to the lead 2, a transfer pulse applied to lead 3 transfers the flux condition at the output aperture of the negating core element 50 to the input aperture of the straight core element 54. The negating element 50 is then cleared in response to a pulse applied at the lead 4. In this manner it will be seen that whatever binary digit was stored in the core element 52, the other binary digit will be shifted to the core element 54 by virtue of the negating effect of the negating core element 50. The theory of transfer is otherwise identical to that explained above in connection with FIG. 4 and described in more detail in the above-mentioned copending application.

Figure 8:
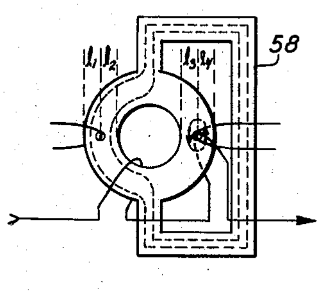
FIG. 8 shows a modified negating core element configuration.

A modification of the negating core element configuration is shown in FIG. 8. In this embodiment, the shunting portion of the core element is made much longer in length than the annular portion of the core which it shunts. In this manner it is possible to eliminate the holding winding on the shunting portion. The reason is that when a transfer pulse is applied to the input winding for reversing flux in the leg $l_1$, the flux path length through the leg $l_3$ is so much shorter than the flux path length through the shunt portion that normally all of the flux will reverse in the leg $l_3$ before any of the flux will reverse in the shunting portion.

Figure 9:
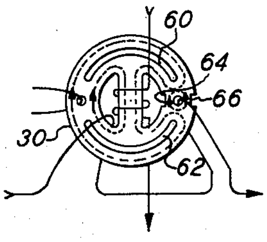
FIG. 9 shows a negating core element having shaping features which improve its performance.

Improvement in the operation of the negating core device can be effected by careful attention to core shaping. One thing that has been done to improve performance is to provide the core with a pair of arcuate slots 60 and 62 as shown in FIG. 9. These arcuate slots divide the annular portion of the core into two flux paths, the arcuate slots extending substantially throughout the regions between the input and output apertures. The effect of the arcute slots is to force the flux in the leg $l_1$ when a negating core element is cleared to extend around substantially to the output aperture before passing through the shunting portion of the core. By this means substantially all the core material is saturated in response to the clearing pluse. In the absence of the slots, as shown in FIGS. 5 and 6, large areas exist on either side of the output aperture 38 in which the condition of the flux is not influenced by the clearing winding 40. It has been found as a general rule that a much sharper threshold region at which flux begins to switch is achieved if the unsaturated regions of the core are reduced to a minimum. The arcuate slots 60 and 62 have this effect. This means that the flux conditions of the core for binary zeroes and binary ones are much more sharply differentiated.

Additional improvement in operation of the negating core circuit can be effected by notching out the core on either side of the output aperture, as indicated at 64 and 66. By providing a restriced cross-sectional area in the region of the output aperture, saturation of the leg $l_3$ in response to setting of the input aperture by transfer of a binary one into the negating core is assured. Thus by the notching, a zero flux condition around the output aperture of the core following the transfer of a binary one to the input aperture is more complete.

Figure 10:
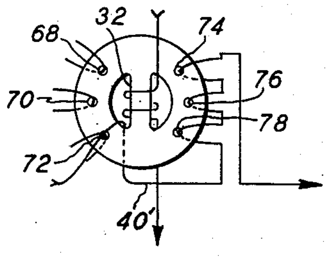
FIG. 10 shows a negating core element with multiple input and output apertures.

As in the case of the straight core device, as described in detail in the above-mentioned copending application, multiple input and output apertures can be provided in the negating core element. As shown in FIG. 10, several apertures can be provided in the annular portion of the core on either side of the shunting portion 32. Thus any one of the apertures 68, 70 and 72, for example (FIG. 10), can be used as input apertures. In fact, any one of these apertures may be used as output apertures to effect straight transfer, i.e., without negation. A plurality of negating output apertures 74, 76 and 78 may be provided, for example, but each of the apertures must be linked by the clearing winding 40′. A transfer pulse applied to the windings linked to any one of the three input apertures 68, 70 and 72 will reverse the flux in the inner legs formed by the output apertures, thus changing them all to the flux condition corresponding to a binary zero, in the manner described above in connection with the single output aperture of FIGS. 5 and 6.

What is claimed is:

1. A negating magnetic core circuit comprising a core of magnetic material having a substantially rectangular hysteresis loop, the core having a substantially annular rim portion with a magnetic shunting portion extending between opposite regions of the annular rim portion, the core having first and second small apertures extending through the annular rim portion of the core and located respectively on opposite sides of the shunting portion, a holding winding wound on the shunting portion, means for producing a unidirectional current through the holding winding, a clearing winding wound on the annular rim portion of the core and including turns linking the core through one of the small apertures, the aperture linked by the clearing winding being on the opposite side of the shunt from the part of the annular rim portion of the core on which the balance of the clearing winding is wound, means for pulsing the clearing winding with a unidirectional current, transfer windings linking the first and second apertures respectively, and means for separately pulsing the transfer windings with unidirectional current for transferring information into and out of the core.

2. A negating magnetic core circuit comprising a core of magnetic material having a substantially rectangular hysteresis loop, the core having a substantially annular rim portion with a magnetic shunting portion extending between opposite regions of the annular rim portion, the core having first and second small apertures extending through the annular rim portion of the core and located respectively on opposite sides of the shunting portion, a holding winding wound on the shunting portion, means for producing a unidirectional current through the holding winding, a clearing winding wound on the annular portion of the core and including turns linking the core through one of the apertures, means for pulsing the clearing winding with a unidirectional current, transfer windings linking the first and second apertures respectively, and means for separately pulsing the transfer windings with unidirectional current for transferring information into and out of the core.

3. A negating magnetic core circuit comprising a core of magnetic material having a substantially rectangular hysteresis loop, the core having a substantially annular rim portion with a magnetic shunting portion extending between opposite regions of the annular rim portion, the core having first and second small apertures extending through the annular rim portion of the core and located respectively on opposite sides of the shunting portion, a clearing winding wound on the annular portion of the core and including turns linking the core through one of the small apertures, means for pulsing the clearing winding with a unidirectional current, transfer windings linking the first and second apertures respectively, and means for separtely pulsing the transfer windings with unidirectional current for transferring information into and out of the core.

4. A negating magnetic core circuit comprising a core element of magnetic material having a substantially rectangular hysteresis loop, the core having a substantially annular portion with a magnetic shunting portion extending between opposite regions of the annular portion, the core having first and second apertures extending through the annular portion of the core and located respectively on opposite sides of the shunting portion, a clearing winding wound on the annular portion of the core and including turns linking the core through one of the apertures, means for pulsing the clearing winding with a unidirectional current, and transfer windings linking the first and second apertures respectively.

5. A negating magnetic core circuit comprising a core element of magnetic material having a substantially rectangular hysteresis loop, the core having a substantially annular portion with a magnetic shunting portion extending between opposite regions of the annular portion, the core having first and second apertures extending through the annular portion of the core and located respectively on opposite sides of the shunting portion, a clearing winding wound on the core and including turns linking the core through one of the apertures, means for pulsing the clearing winding with a unidirectional current, and transfer windings linking the first and second apertures respectively.

6. Apparatus as defined in claim 5 wherein the annular portion of the core is provided with two slots that each divide the annular portion into two substantially concentric branches, the slots extending from the region of one aperture to the region of the other aperture and respectively extending through on opposite regions of the annular portion of the core between the regions of the apertures.

7. Apparatus as defined in claim 5 wherein the annular portion of the core is reduced in cross-sectional area at the position of the aperture linked by the clearing winding.

8. A magnetic core circuit comprising a core element of magnetic material having a substantially rectangular hysteresis loop, the core element including first, second and third separate flux-carrying legs, the first and third legs each having a small aperture therethrough for splitting the associated leg into two parallel flux branches, a first current conductor having a portion wound around the first leg and a portion passing through the aperture in the third leg and linking one of the branches formed by the aperture in the third leg, and a second current conductor having a portion passing through the aperture in the first leg and linking only one of the branches formed by said aperture.

9. A negating magnetic core circuit comprising a core element of magnetic material having a substantially rectangular hysteresis loop, the core element including three separate flux-carrying legs, two of the legs each having a small aperture therethrough for splitting the respective legs into two parallel flux branches in the region of each aperture, first winding means responsive to a current pulse for setting the flux in opposite directions in the two branches formed by the aperture in one of said legs, second winding means responsive to a current pulse for setting the flux in the same direction in the two branches formed by the aperture in the other of said apertured legs, and third winding means responsive to a current pulse for reversing the flux in one of the two branches in each of the apertured legs.

References Cited in the file of this patent

UNITED STATES PATENTS

| | | |
|---|---|---|
| 2,810,901 | Crane | Oct. 22, 1957 |
| 2,846,673 | Gray | Aug. 5, 1958 |
| 2,868,451 | Bauer | Jan. 13, 1959 |